(12) United States Patent
Rajaram et al.

(10) Patent No.: US 9,858,318 B2
(45) Date of Patent: Jan. 2, 2018

(54) MANAGING DATA ENTITIES USING COLLABORATIVE FILTERING

(75) Inventors: Shyam Sundar Rajaram, San Francisco, CA (US); Craig Peter Sayers, Menlo Park, CA (US); Rajan Lukose, Oakland, CA (US); Martin Scholz, San Francisco, CA (US)

(73) Assignee: EntIT Software LLC, Sunnyvale, CA (US)

( * ) Notice: Subject to any disclaimer, the term of this patent is extended or adjusted under 35 U.S.C. 154(b) by 651 days.

(21) Appl. No.: 14/372,976

(22) PCT Filed: Jan. 20, 2012

(86) PCT No.: PCT/US2012/022074
§ 371 (c)(1),
(2), (4) Date: Jul. 17, 2014

(87) PCT Pub. No.: WO2013/109288
PCT Pub. Date: Jul. 25, 2013

(65) Prior Publication Data
US 2014/0372453 A1 Dec. 18, 2014

(51) Int. Cl.
*G06F 17/30* (2006.01)

(52) U.S. Cl.
CPC .... *G06F 17/3053* (2013.01); *G06F 17/30029* (2013.01)

(58) Field of Classification Search
None
See application file for complete search history.

(56) References Cited

U.S. PATENT DOCUMENTS

| | | | |
|---|---|---|---|
| 8,452,797 B1* | 5/2013 | Paleja | G06Q 30/02 707/767 |
| 2002/0120609 A1 | 8/2002 | Lang | |
| 2002/0198882 A1* | 12/2002 | Linden | G06F 17/30867 |
| 2008/0294624 A1 | 11/2008 | Kanigsberg et al. | |
| 2011/0010307 A1 | 1/2011 | Bates et al. | |
| 2011/0184899 A1 | 7/2011 | Gadanho et al. | |

(Continued)

FOREIGN PATENT DOCUMENTS

| | | |
|---|---|---|
| KR | 20110074167 A | 6/2011 |
| WO | WO-2006055983 A2 | 5/2006 |

OTHER PUBLICATIONS

Davidsson, Christoffer; "Mobile Application Recommender System", published Dec. 2010; Examensarbete 30 hp. Uppsala Universitet.

(Continued)

*Primary Examiner* — Anh Tai Tran (57) ABSTRACT

In a method for managing a plurality of data entities, data pertaining to transactions by a plurality of users with respect to the data entities is collected and a collaborative filtering operation is applied on the data entities to determine similarity levels of the data entities with respect to each other. In addition, for at least one of the data entities, remaining ones of the data entities are ranked according to the determined similarities while discounting for popularities of the data entities. Moreover, identifications of at least another one of the data entities having the highest rankings to the at least one of the data entities are presented to a first user to recommend the at least another one of the data entities for use by the first user.

18 Claims, 6 Drawing Sheets

(56) References Cited

U.S. PATENT DOCUMENTS

2011/0202400 A1  8/2011  Bedard et al.
2011/0202821 A1  8/2011  Roy et al.
2011/0231405 A1  9/2011  Herbrich et al.

OTHER PUBLICATIONS

International Search Report and Written Opinion of the International Searching Authority, dated May 4, 2012; issued in related PCT Application No. PCT!US2012/022074.

* cited by examiner

FIG. 5

MANAGING DATA ENTITIES USING COLLABORATIVE FILTERING

CROSS-REFERENCE TO RELATED APPLICATION

This application is a national stage application under 35 U.S.C. §371 of PCT/US2012/022074, filed Jan. 20, 2012.

BACKGROUND

Advances in communication infrastructures and devices have led to a proliferation of content, such as, software applications, available for download onto electronic devices. These advances have also led to the creation of application stores, such as, servers that maintain large inventories of content available for purchase and download. Currently, there are hundreds of thousands of different content available for various electronic device formats from the application stores, and this number continues to increase. The large number of available content often makes it difficult for users to identify content that may be of interest to users of the application stores.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are a method and apparatus for managing a plurality of data entities that are available for use on user devices. More particularly, determinations of which of the data entities are the most similar to which of the other data entities are to be made and identifications of the most similar ones of the data entities to particular ones of the data entities are to be presented to users. As discussed in greater detail herein below, the similarities between the data entities are determined through application of a collaborative filtering operation on the data entities. In one example, a weighted collaborative filtering operation is applied, in which the values for a plurality of weights applied in the weighted collaborative filtering operation are determined from data pertaining to transactions by a plurality of users with respect to the data entities. In any regard, the transactions include installation, deletion, and usage by the plurality of users of the data entities as well as the times at which the plurality of users performed the transactions with respect to the data entities.

The determined similarities between the data entities are used to determine which of the data entities are to be presented to the users as recommendations of data entities to which the users may be interested. In one regard, the recommended data entities are generally selected using considerations that may be focused on other users' transactions with the data entities instead of just the number of users that use the particular data entities.

Through implementation of the method and apparatus disclosed herein, users may be exposed to a wide range of data entities, such as, entertainment media, applications, etc., that are likely to be of interest to the users. In addition, the users may be provided with additional information about the data entities, which the users may use in selecting the data entities for use on their devices.

As used in the present disclosure, a data entity generally comprises a set of instructions or a set of data that users may use on their electronic devices. In one regard, the data entity may comprise software applications (Apps), music, movies, etc., that may be available for download from an application store, such as the WebOS™ application store. In addition, the electronic devices comprise smartphones, tablet personal computers, personal digital assistants, personal computers, e-book readers, and other types of electronic devices on which data entities may be downloaded and installed.

Figure 1:
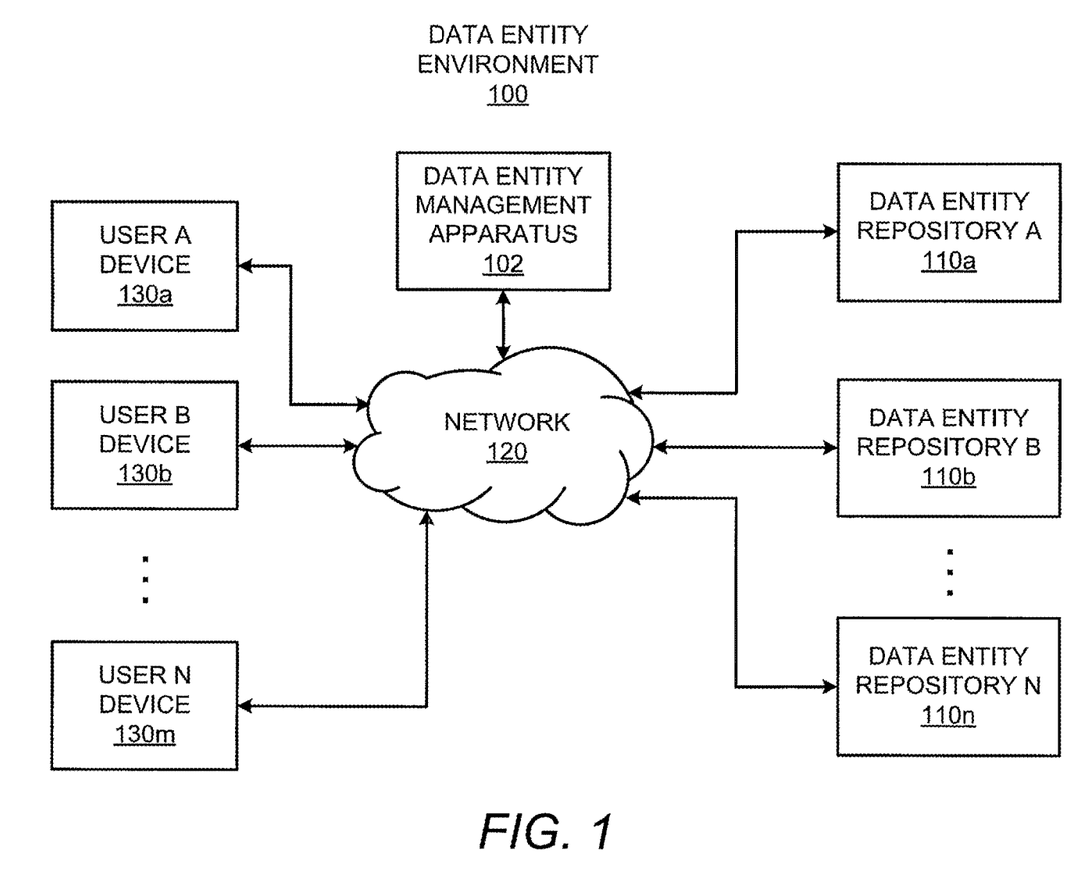
FIG. 1 depicts a simplified block diagram of a data entity environment in which various aspects of the methods disclosed herein may be implemented, according to an example of the present disclosure.

With reference first to FIG. 1, there is shown a simplified block diagram of a data entity environment 100 in which various aspects of the methods disclosed herein may be implemented, according to an example. It should be understood that the data entity environment 100 may include additional elements and that some of the elements depicted therein may be removed and/or modified without departing from a scope of the data entity environment 100. For instance, the data entity environment 100 may include any number of data entity management apparatuses 102, data entity repositories 110a-110n, etc.

The data entity environment 100 is depicted as including a data entity management apparatus 102, a plurality of data entity repositories 110a-110n, a network 120, and a plurality of user devices 130a-130m. The variables "n" and "m" generally denote integer values greater than one and may denote different values with respect to each other. In any regard, the data entity management apparatus 102 is depicted as being in communication with the data entity repositories 110a-110n and the user devices 130a-130m through the network 120. The network 120 comprises any suitable network for facilitating communication of data between the elements of the data entity environment 100. Examples of suitable networks 120 include, the Internet, a cellular network, a local area network, a wide area network, etc.

The data entity repositories 110a-110n generally comprise repositories that store respective data entities. In this regard, the data entity repositories 110a-110n may comprise various services or stores from which the user devices 130a-130n may download the data entities. Thus, for instance, the data entity repositories 110a-110n may comprise the WebOS™ App Catalog or other store from which the data entities may be downloaded. Although not shown, each of the data entity repositories 110a-110n may include a server to manage access to and downloading of data entities from the data entity repositories 110a-110n. In addition, although a plurality of data entity repositories 110a-110n have been depicted in FIG. 1, it should be understood that the data entity environment 100 may include a single data entity repository 110a without departing from a scope of the data entity environment 100.

The data entity management apparatus 102 comprises a server or other computing device. The data entity management apparatus 102 is to collect various information pertaining to transactions by the user devices 130a-130m with respect to the data entities contained in the data entity repositories 110a-110n. In one example, the data entity management apparatus 102 uses the collected information to determine which of the data entities are similar or related to other data entities. In this example, the data entity management apparatus 102 uses various aspects of the interactions the users have with the data entities in determining the similarities or relatedness of the data entities with respect to each other as discussed in greater detail herein below.

In any regard, the data entity management apparatus 102 is to rank, for at least one of the data entities, the remaining data entities according to their determined similarities to the at least one of the data entities. As such, for instance, when a user is browsing through or has selected a particular data entity to obtain additional information about the particular data entity, the user may be provided with identifications of a number of the highest ranked data entities based upon similarities to that particular data entity. The identifications of the highest ranked data entities may be provided, for instance, as recommendations for other data entities that may be of interest to the user. According to an example, the ranking of the data entities is performed while discounting for the popularities of the data entities. That is, for instance, the most popular ones of the data entities may be removed and/or caused to have a lower rank because users are already likely to have discovered the most popular data entities and because without such discounting the most popular data entities would dominate to such an extent that users would quickly find the list uninteresting.

The user devices 130a-130m generally comprise any suitable electronic device through which users may access, download, and install data entities from the data entity repositories 110a-110n. In this regard, the user devices 130a-130m may comprise, personal computers, laptop computers, tablet PCs, smartphones, e-book readers, personal digital assistants, portable media players, etc. In addition, the user devices 130a-130m may connect to the network 120 through any suitable connection, such as, through a wifi connection, a cellular connection, a wifi hotspot, a local area network connection that is connected to the network 120, etc.

Figure 2:
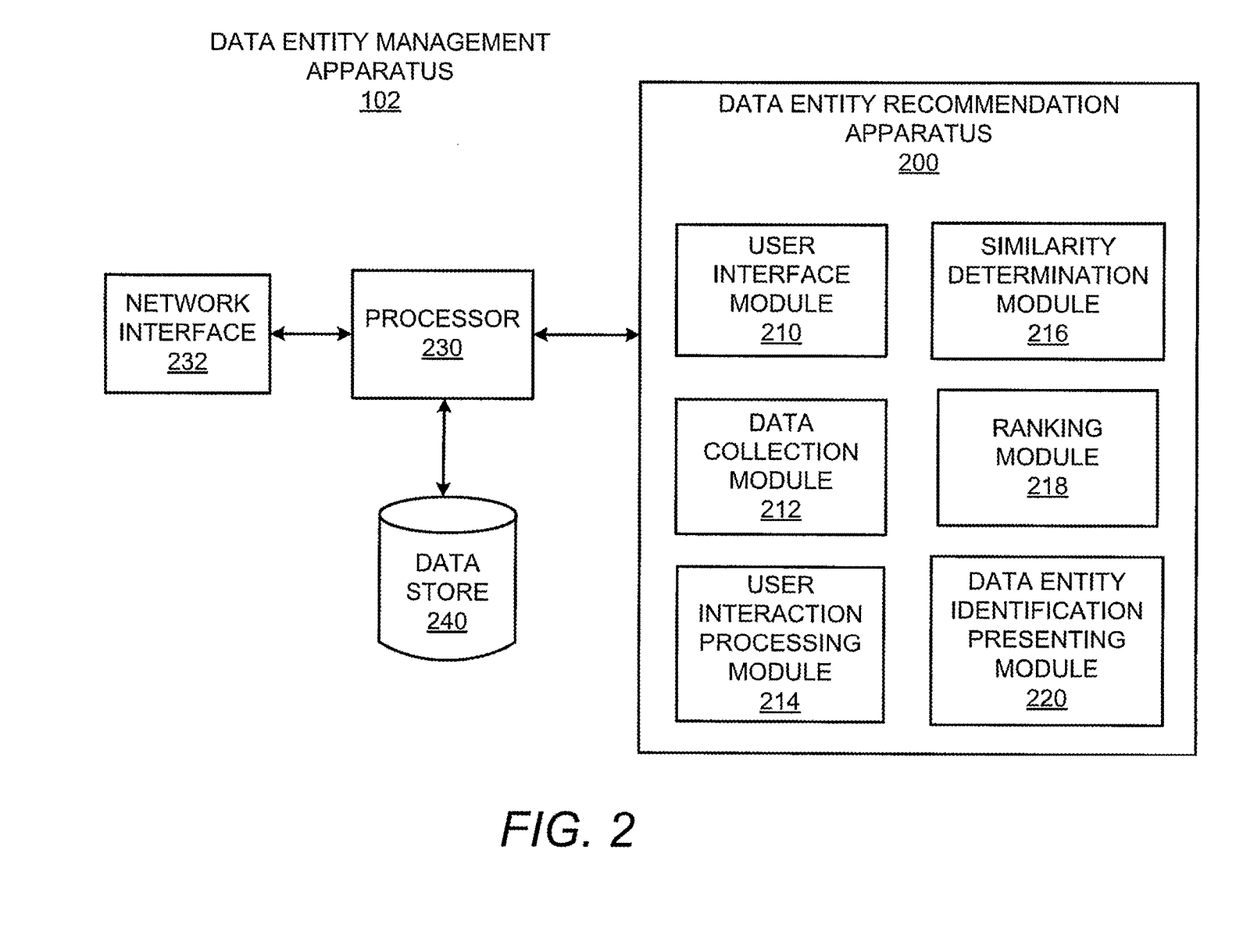
FIG. 2 depicts a more detailed block diagram of the data entity management apparatus depicted in FIG. 1, according to an example of the present disclosure.

Turning now to FIG. 2, there is shown a more detailed block diagram of the data entity management apparatus 102 depicted in FIG. 1, according to an example. It should be understood that the data entity management apparatus 102 may include additional elements and that some of the elements depicted therein may be removed and/or modified without departing from a scope of the data entity management apparatus 102.

As shown in FIG. 2, the data entity management apparatus 102 includes a data entity recommendation apparatus 200, a processor 230, a network interface 232, and a data store 240. The data entity recommendation apparatus 200 is depicted as including a user interface module 210, a data collection module 212, a user interaction processing module 214, a similarity determination module 216, a ranking module 218, and a data entity identification presenting module 220.

The processor 230, which may comprise a microprocessor, a micro-controller, an application specific integrated circuit (ASIC), and the like, is to perform various processing functions in the data entity management apparatus 102. One of the processing functions includes invoking or implementing the modules 210-220 of the data entity recommendation apparatus 200 as discussed in greater detail herein below.

According to an example, the data entity recommendation apparatus 200 comprises a hardware device, such as, a circuit or multiple circuits arranged on a board. In this example, the modules 210-220 comprise circuit components or individual circuits. According to another example, the data entity recommendation apparatus 200 comprises software stored, for instance, in a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In this example, the modules 210-220 comprise software modules stored in the memory. According to a further example, the modules 210-220 comprise a combination of hardware and software modules.

The network interface 232 may comprise hardware and/or software to enable the data entity management apparatus 102 to communicate data to and receive data from the network 120. The processor 230 may store the received data in the data store 240 and may use the data in implementing the modules 210-220. The data store 240 may comprise volatile and/or non-volatile memory, such as DRAM, EEPROM, MRAM, phase change RAM (PCRAM), Memristor, flash memory, and the like. In addition, or alternatively, the data store 240 may comprise a device configured to read from and write to a removable media, such as, a floppy disk, a CD-ROM, a DVD-ROM, or other optical or magnetic media. The processor 230 may store additional data, for instance, identifications of the data entities that have been determined to be similar to each other as well as the respective rankings of the data entities.

Figure 3:
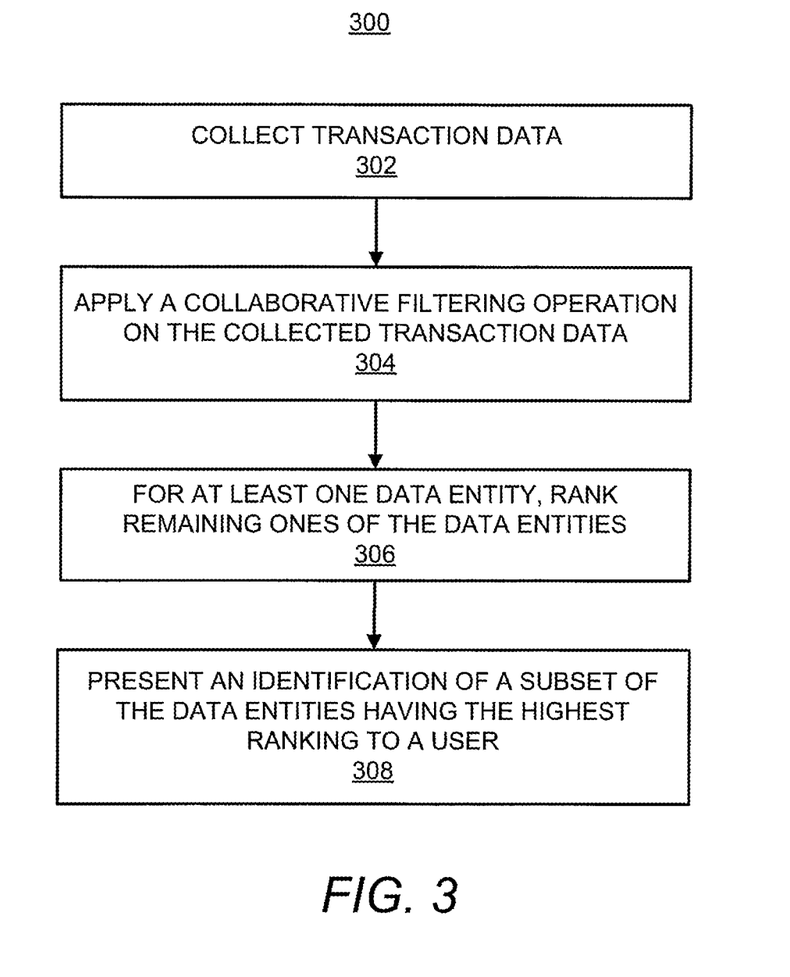
FIG. 3 shows a flow diagram of a method for managing a plurality of data entities, according to an example of the present disclosure.

Various manners in which the modules 210-220 of the data entity recommendation apparatus 200 may be implemented are discussed in greater detail with respect to the method 300 depicted in FIG. 3. FIG. 3, more particularly, depicts a flow diagram of a method 300 for managing a plurality of data entities, according to an example. It should be apparent to those of ordinary skill in the art that the method 300 represents a generalized illustration and that other steps may be added or existing steps may be removed, modified or rearranged without departing from a scope of the method 300. Although particular reference is made to the data entity environment 100 and the data entity management apparatus 102 depicted in FIGS. 1 and 2 as comprising environments in which the operations described in the method 300 may be performed, it should be understood that the method 300 may be performed in differently configured systems and apparatuses without departing from a scope of the method 300.

At block 302, data pertaining to transactions by a plurality of users with respect to the data entities is collected, for instance, by the data collection module 212. The data may comprise information pertaining to which of the data entities are being used by which of the users, information pertaining to when the data entities are being downloaded, information pertaining to how many of the respective data entities are being downloaded, etc. The data may also comprise information pertaining to the users' ratings of the data entities, which of the data entities have been deleted and by which of the users, when the data entities have been deleted, when the data entities have been updated and by which of the users, whether an attempted download and installation of a data entity has occurred, etc. In this regard, the user's various interactions with respect to the data entities may be time stamped indicating the time instant corresponding to the various interactions.

According to an example, the data entity recommendation apparatus 200 is in communication with the servers that manage the data entity repositories 110a-110n. In this example, the data collection module 212 may receive data accumulated by those servers with respect to the users' interactions with the data entities. Thus, for instance, the servers may accumulate data pertaining to the users' interactions with the data entities over a period of time and may communicate the accumulated data to the data entity recommendation apparatus 200. In one example, the servers may communicate the accumulated data to the data collection module 212 on a predetermined basis, for instance, hourly, daily, weekly, etc.

According to an example, the data entity management apparatus 102 comprises a server that manages the data entity repositories 110a-110n. In this example, the data entity management apparatus 102 may collect the data directly as the users interact with the data entities contained in the data entity repositories 110a-110n.

The data entity management apparatus 102 may also collect data pertaining to transactions by the plurality of users with respect to the data entities from the user devices 130a-130m. More particularly, for instance, the user devices 130a-130m may execute machine readable instructions to track user interactions with respect to the data entities and to communicate the tracked user interactions to the data entity management apparatus 102.

At block 304, a collaborative filtering operation is applied on the collected transaction data to determine similarity levels of the data entities with respect to each other, for instance, by the similarity determination module 216. In certain examples, a weighted collaborative filtering operation is applied. In any regard, the similarity determination module 216 is to determine, for at least one of the data entities, the similarity levels of the data entities stored in the data entity repositories 110a-110n to that at least one data entity. The similarity determination module 216 may determine the similarity levels of the data entities to a plurality of different data entities. According to example, the plurality of different data entities may comprise a subset, for instance, the top 10 or top 100 data entities, ranked by popularity. In another example, the plurality of different data entities may comprise all of the data entities contained in the data entity repositories 110a-110n.

The similarity determination module 216 may implement a similarity function, such as, and item-item collaborative filtering function, between the different data entities to determine their respective similarities. According to a particular example, the similarity determination module 216 implements the following similarity function:

$$S(i, j) = \frac{\begin{pmatrix} w_1 * \# \text{ users who have data entities } i \text{ and } j + \\ w_2 * \# \text{ users who installed data entities } i \text{ and } \\ j \text{ in a short time window} + \\ w_3 * \# \text{ users who deleted data entity } i \text{ and } \\ \text{installed data entity } j \text{ in a short time window} \end{pmatrix}}{\sqrt{((w_1 + w_2 + w_3) * \# \text{users who have data entity } j)} * \sqrt{\begin{pmatrix} ((w_1 + w_2) * \# \text{ users who have data entity } i + \\ (w_3) * \# \text{ users who have removed data entity } i) \end{pmatrix}}} \quad \text{Equation (1)}$$

In Equation (1), S represents a similarity measure (S), i and j represent respective different data entities, and $w_1$, $w_2$, $w_3$ comprise predetermined weights. According to a particular example, the weights $w_1$, $w_2$, $w_3$ comprise the same value.

Through implementation of the collaborative filtering operation at block 304, similarity levels between different data entities (i and j) may be determined. In this regard, the similarity levels between each pair of data entities in the data entity repositories 110a-110n may be determined. The processor 230 may store the similarity levels between the pairs of data entities in the data store 240.

According to an example, the weights in Equation (1) are modified using the transaction data collected at block 302. In one regard, the user interaction processing module 214 may process the collected transaction data to identify, for instance, the times at which the data entities have been downloaded by which of the users, the times at which the data entities have deleted by which of the users, the times at which the data entities have been updated by which of the users, etc. The weights may also be modified based upon some content information about the different data entities. Various manners in which the weights may be modified will now be the described. It should be understood that each of the different examples presented below may be implemented separately or that multiple ones of the different examples below may be implemented together in modifying the weights.

In a first example, the weights may be modified based upon a determination of the users' interest in the data entities. In this example, a user is considered to have interest in a data entity only if the user has retained the data entity for at least a predetermined length of time, such as, a predetermined number of days. In this regard, users are considered to have a higher interest level in those data entities that the users retain for a longer length of time. In this example, an interest level of the users to the data entities may be determined based upon retention patterns of the data entities by users. In addition, the weighted collaborative filtering operation may be implemented by weighting the data entities having higher interest level of the users higher than the data entities having lower interest levels of the users. The retention information of the users may be used to determine retention ratings of the data entities, such as, the percentage of users that downloaded the data entities and retained the data entities for at least predetermined length of time. By way of particular example, the predetermined length of time at which a user is determined to be interested in a particular data entity is at least 15 days.

One complication in measuring retention of the users is that some data entities have paid and free variants, so, for example, a user may install a free version of a data entity and then switched to a paid version of that data entity. This behavior may result in the retention percentage being inaccurately low for that data entity. One approach to adjusting for this occurrence is to consider all of the different versions of a data entity and computes retention as a fraction of users who still have any variant of a data entity after N days.

In a second example, the weights may be modified based upon the separation in terms of a length of time between installations of the different data entities. In this example, for each of the users, a difference in time at which the respective users downloaded the data entities may be determined from the transaction data collected at block 302. In addition, the weighted collaborative filtering operation may be implemented by weighting the data entities that were downloaded by the respective users within a predetermined length of time with respect to each other higher than the data entities that were downloaded outside of the predetermined length of time. By way of particular example, the predetermined length of time is within 2 days.

In a third example, the weights may be modified based upon the separation in terms of a length of time between a deletion of one of the data entities and installation of another one of the data entities. In this example, for each of the users, the data entity pairs that correspond to a first data entity that has been downloaded within a predetermined length of time following deletion of a second data entity is determined. In addition, the weighted collaborative filtering operation may be implemented by weighting the data entity pairs that meet this criteria higher than data entity pairs that do not meet this criteria. By way of particular example, the predetermined length of time between deletion of the second data entity and downloading of the first data entity is within 20 minutes.

In a fourth example, the weights may be modified based upon category information pertaining to the data entities. In this example, the categories into which the data entities belong may be determined. The categories may be selected by the developers of the data entities, and may include, for instance, games, productivity, social networking, sports, etc. In addition, the weighted collaborative filtering operation may be implemented by weighting data entity pairs that belong to the same categories higher than data entity pairs that do not belong to the same categories.

In a fifth example, the weights may be modified based upon developer information pertaining to the data entities. In this example, the developers of the data entities may be determined. In addition, the weighted collaborative filtering operation may be implemented by weighting data entity pairs that were developed by the same developers higher than data entity pairs that were developed by different developers.

In a sixth example, the weights may be modified based upon semantic information of the data entities. In this example, semantic information, for instance, titles, descriptive text, tags, etc., of the data entities may be determined. In addition, the weighted collaborative filtering operation may be implemented by weighting data entity pairs having similar semantic information higher than data entity pairs that have dissimilar semantic information. Thus, for instance, data entity pairs having similar titles and/or related concepts in their descriptions may have a higher weighting is compared with other data entity pairs that do not share similar titles and/or related concepts.

At block 306, for at least one of the data entities, remaining ones of the data entities are ranked according to their determined similarities, for instance, by the ranking module 218. In other words, for a particular data entity, the remaining data entities may be ranked according to their respective similarities to the particular data entity. This may be performed for each of a set of data entities or for all of the data entities contained in the data repositories 110*a*-110*n*. In any regard, the data entities may be ranked to determine which of the data entities are most similar to other ones of the data entities, based upon the similarity determinations made at block 304.

According to an example, the ranking of the data entities is performed while discounting for popularities of the data entities. Thus, for instance, the ranking is performed while removing popular data entities from being recommended to all of the users, for instance, by the ranking module 218. More particularly, for instance, highly popular data entities are likely to have been downloaded and retained by a large number of users and thus, are likely to appear to be related to a large number of other data entities. In order to substantially prevent such popular data entities from always being recommended, the data entities are re-ranked based on a modeling of the power law relation between the rank by popularity of the data entity versus the number of users who have the data entity. This relation has the form $\beta*\exp(-\alpha*rank)$. By way of example, consider a data entity that has a ranking r1 based on popularity and a ranking r2 based on the collaborative filtering operation performed at block 304. In this example, also consider that the rank of data entity improves from r1 to r2. The area under the curve between the two ranks r1 and r2 is proportional to $\exp(-\alpha*r2)-\exp(-\alpha*r1)$.

In one regard, those data entities having the largest areas under the respective curves are ranked higher at block 306 than those data entities having smaller areas under the curve. By way of example, consider a first data entity having a ranking r1 of 10 based on popularity and ranking r2 of 9 based on the ranking determined at block 306. Consider also a second data entity having a ranking r1 of 500 based on popularity and a ranking r2 of 10 based on the ranking determined at block 306. In this example, the rise in the ranking of the second data entity is of much greater significance than the rise in the ranking of the first data entity. As such, the second data entity may be ranked to be higher than the first data entity at block 306. In one regard, therefore, the re-ranking generally limits the effects of popularity from the recommended data entities by re-ranking the ranked list of data entities obtained at block 306 based on a linear combination of the normalized area under the curve and normalized similarity score.

At block 308, identifications of at least another one of the data entities having the highest rankings (or re-rankings) to the at least one of the data entities is presented to a first user, for instance, by the data entity identification presenting module 220. In other words, identifications of, for instance, the five or more highest ranked data entities to the at least one data entity are supplied to the first user to recommend the highest ranked data entities to the first user.

According to an example, the identifications of the at least another one of the data entities having the highest rankings to the at least one of the data entities may be supplied to the first user in response to a determination that the first user is interested in the at least one data entity. More particularly, for instance, a determination that the first user has selected the at least one data entity in a user interface of the data entity repositories 110*a*-110*n* may be made. The selection may be for seeking additional information pertaining to the data entity, for downloading of the data entity, for purchasing the data entity, etc. In addition, the selection of the data entity, for instance, as the first user is browsing the user interface of the data entity repositories 110a-110n, may result in the presentation to the first user a number of recommended data entities that are similar to the selected data entity.

Figure 4A:
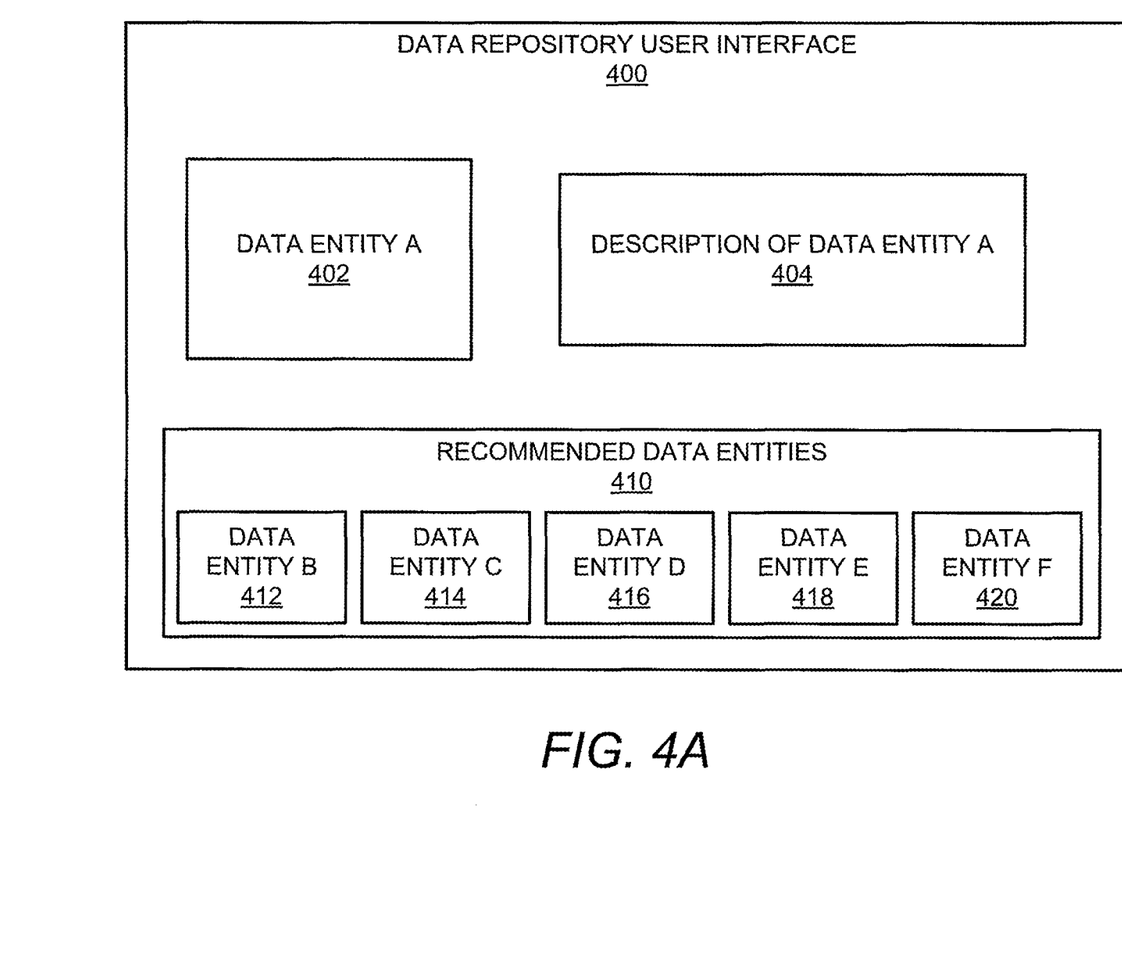
FIGS. 4A and 4B, respectively illustrate simplified data repository user interfaces that may be provided by a user interface module, according to examples of the present disclosure.

An example of a simplified data repository user interface 400 that may be presented by the user interface module 210 as a web-based interface is depicted in FIG. 4A. As shown therein, the selected data entity 402A may be depicted, for instance, in textual and/or graphical form, such as, an icon that particularly identifies the data entity 402. A description of the data entity 404 may also be provided, which may also include various other information, such as, user ratings, screenshots, retention ratings, etc., of the data entity 402. Also depicted in the user interface 400 are identifications of a number of recommended data entities 410. Each of the data entities 412-420 contained in the recommended data entities 410 represents, for instance, the highest ranked (or re-ranked) ones of the data entities 410 to the data entity 402. In this regard, a user viewing the data repository user interface 400 may be presented with a number of additional recommended data entities 410 that are similar to the data entity 402 to which they are interested.

The identifications of the recommended data entities 412-420 may also be in textual and/or graphical form, such as, an icon that particularly identifies the data entities 412-420. In addition, other information pertaining to the recommended data entities 412-420, such as, user ratings, retention ratings, similarity ratings, etc., may also be displayed in the user interface 400. Moreover, the identifications may comprise hyperlinks, such that, selection of any of the data entities 412-420 results in, for instance, opening of another webpage that contains more information about the selected data entity. Furthermore, a number of recommended data entities for the selected one of the data entities 412-420 may also be displayed in the new webpage.

According to another example, the identifications of the at least another one of the data entities having the highest rankings to the at least one of the data entities may be supplied to the first user based upon the data entities currently stored in the user device. More particularly, for instance, identifications of data entities currently downloaded onto the user's device may be determined. The data entity recommendation apparatus 200 may make this determination based upon information pertaining to which data entities the user downloaded from the data entity repositories 110a-110n. In addition, or alternatively, the data entity recommendation apparatus 200 may make this determination from information received from the user device pertaining to the data entities contained therein. Moreover, the data entity recommendation apparatus 200 may determine which of the data entities are to be recommended to the first user based upon the current data entities. In this regard, the data entity recommendation apparatus 200 may determine the highest ranked (or re-ranked) ones of the data entities for the current data entities and may provide the recommended data entities to the user through a user interface.

Figure 4B:
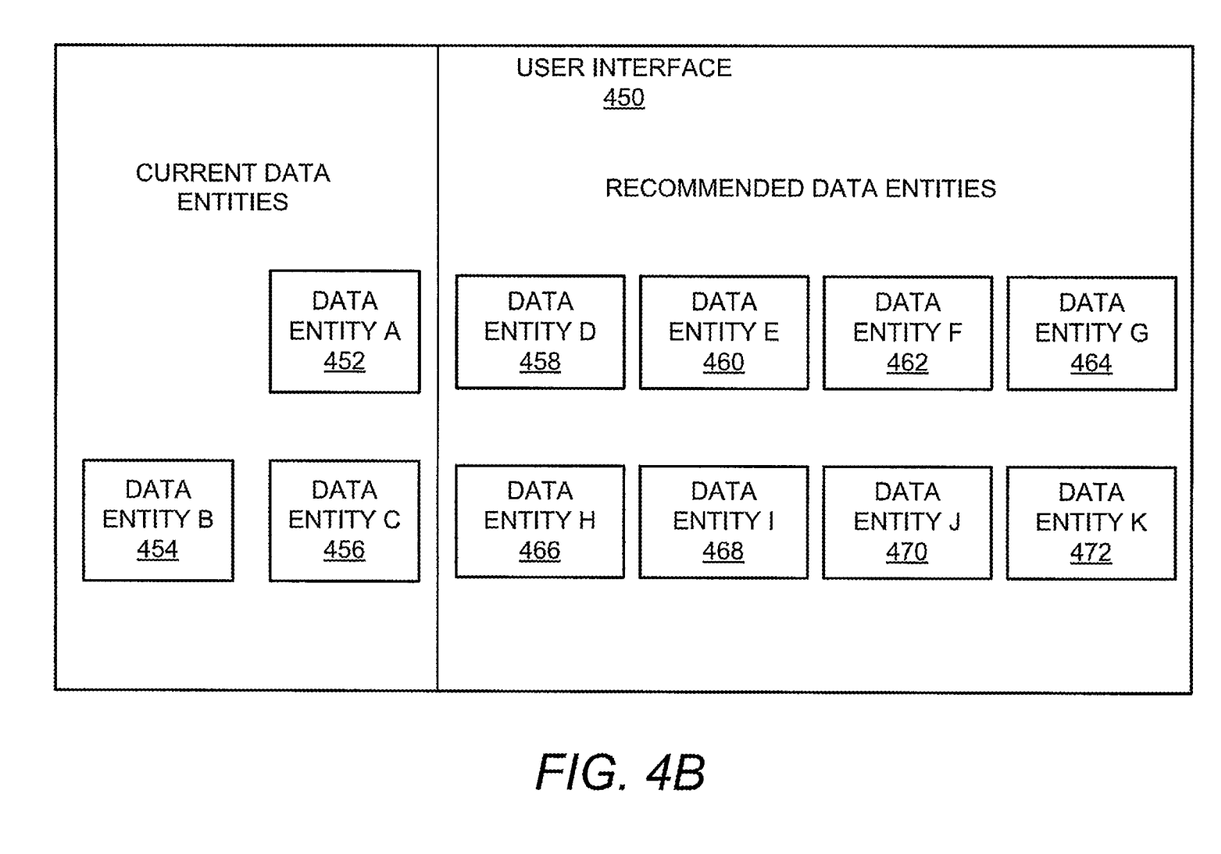

An example of a simplified user interface 450 that may be provided by the user interface module 210 as a web-based interface is depicted in FIG. 4B. As shown therein, the current data entities 452-456 may be depicted, for instance, in textual and/or graphical form, such as, an icon that particularly identifies the data entity 402. As also shown in FIG. 4B, the current data entities may be grouped according to similarities with respect to each other. In the example depicted in FIG. 4A, data entity A 452 differs from data entities B and C 454, 456, while data entities B and C 454, 456 are similar to each other. In other words, the data entities in the current data entity section of the user interface 450 may be grouped according to the types of recommendations that are likely to be provided for those data entities. By way of particular example, data entity A 452 may pertain to a scheduling application whereas data entity B 454 pertains to a local weather application and data entity C pertains to a national weather application.

As further shown in FIG. 4B, data entities related to each cluster of current data entities is provided. Thus, for instance, data entities 458-464 may comprise the highest ranked (or re-ranked) ones of the data entities to the data entity 452 determined, for instance, through implementation of the method 300. Likewise, data entities 466-472 may comprise the highest ranked (or re-ranked) ones of the data entities to the data entities 454 and 456 determined, for instance, through implementation of the method 300. In this regard, a user viewing the user interface 450 may be presented with a number of additional recommended data entities 458-472 that are similar to the data entities 452-456 that the user has previously downloaded.

The identifications of the recommended data entities 458-472 may also be in textual and/or graphical form, such as, an icon that particularly identifies the data entities 458-472. In addition, other information pertaining to the recommended data entities 458-472, such as, user ratings, retention ratings, similarity ratings, etc., may also be displayed in the user interface 450. Moreover, the identifications may comprise hyperlinks, such that, selection of any of the data entities 458-472 results in, for instance, opening of another webpage that contains more information about the selected data entity.

According to another example, the user interface 400 may be provided with a button to enable a user to quickly explore a wide range of data entities via the user interface 400. In this example, when the button is pressed, a new data entity is selected and detailed information about that new data entity is displayed in the user interface 402, 404. The selection of the new data entity may be deterministic, for example, the highest-ranked entry from the set of recommended data entities which has not yet been visited by this user, or it may include a random component, for example selecting an entry from among similar data entities with high probability and selecting from among other data entities with lower probability. The random function may further be non-uniform, so as to favor more popular data entities and/or more similar data entities. The selection function may also vary over time, for example, by usually preferring very similar data entities, while picking a random selection from further afield every 4th press. The selected data entities may further be filtered, so as to only select new data entities that are highly-rated, popular, have high retention, and/or have not yet been visited by the user. Each successive selection of the button results in a different data entity being displayed to the user, and so the user may browse large portions of the catalog, by repeatedly pressing a single button. In one example, a new set of recommended data entities 410, is shown along with each new data entity, and thus at each step the user may choose to press the button (and have the system select another new data entity) or may manually choose from among the recommended data entities 410 related to the currently-displayed data entity.

According to a further example, the user interface 400, 450 may determine when a user has deleted a data entity from a user device. In this example, the user may be presented with recommended data entities that may, for instance, be an improvement upon the deleted data entity.

For instance, the user may be presented with a number of alternative data entities that have been determined to have been downloaded by a number of users who also deleted the data entity.

Some or all of the operations set forth in the method 300 may be contained as a utility, program, or subprogram, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 5:
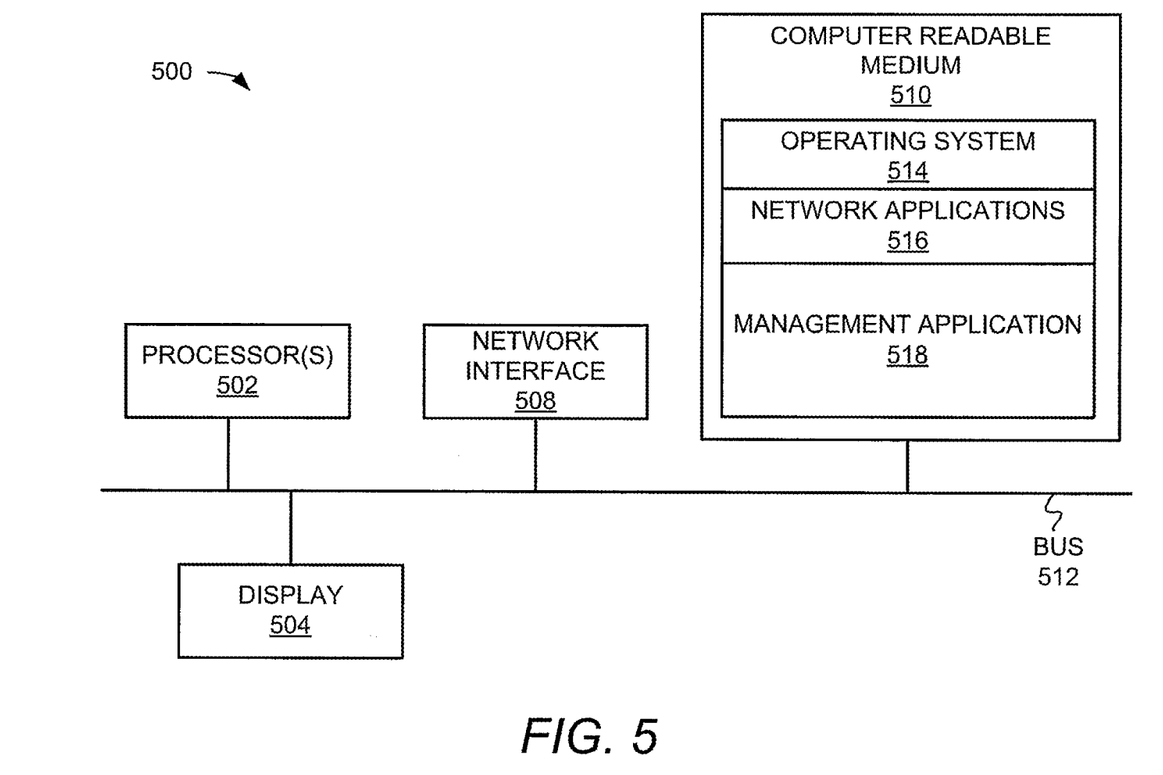
FIG. 5 illustrates a schematic representation of a computing device, which may be employed to perform various functions of the data entity management apparatus depicted in FIG. 1, according to an example of the present disclosure.

Turning now to FIG. 5, there is shown a schematic representation of a computing device 500, which may be employed to perform various functions of the data entity management apparatus 102 depicted in FIGS. 1 and 2, according to an example. The device 500 includes a processor 502, a display 504, such as a monitor; a network interface 508, such as a Local Area Network LAN, a wireless 802.11x LAN, a 3G mobile WAN or a WiMax WAN; and a computer-readable medium 510. Each of these components is operatively coupled to a bus 512. For example, the bus 512 may be an EISA, a PCI, a USB, a FireWire, a NuBus, or a PDS.

The computer readable medium 510 may be any suitable medium that participates in providing instructions to the processor 502 for execution. For example, the computer readable medium 510 may be non-volatile media, such as an optical or a magnetic disk; volatile media, such as memory. The computer-readable medium 510 may also store an operating system 514, such as Mac OS, MS Windows, Unix, or Linux; network applications 516; and a management application 518. The operating system 514 may be multi-user, multiprocessing, multitasking, multithreading, real-time and the like. The operating system 514 may also perform basic tasks such as recognizing input from input devices, such as a keyboard or a keypad; sending output to the display 504; keeping track of files and directories on the computer readable medium 510; controlling peripheral devices, such as disk drives, printers, image capture device; and managing traffic on the bus 512. The network applications 516 include various components for establishing and maintaining network connections, such as machine-readable instructions for implementing communication protocols including TCP/IP, HTTP, Ethernet, USB, and FireWire.

The management application 518 provides various components for managing a plurality of data entities to recommend selected ones of the data entities to users, as described above with respect to the method 300 in FIG. 3. The management application 518 may thus comprise the data entity recommendation apparatus 200. The management application 518 also includes modules for collecting data pertaining to transactions by a plurality of users with respect to the data entities, applying a collaborative filtering operation on the collected data to determine similarity levels of the data entities with respect to at least one of the data entities, ranking the data entities with respect to each other according to the determined similarities, and presenting identifications of at least another one of the data entities having the highest rankings to the at least one of the data entities to a first user to recommend the at least another one of the data entities for use by the first user. In certain examples, some or all of the processes performed by the management application 518 may be integrated into the operating system 514. In certain examples, the processes may be at least partially implemented in digital electronic circuitry, or in computer hardware, machine-readable instructions (including firmware and/or software), or in any combination thereof.

Although described specifically throughout the entirety of the instant disclosure, representative embodiments of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing a plurality of data entities, said method comprising:
    collecting data pertaining to transactions by a plurality of users with respect to the data entities, wherein the data entities are available for use on user devices;
    applying, by a processor, a collaborative filtering operation on the data entities to determine similarity levels of the data entities with respect to each other;
    for at least one of the data entities, ranking remaining ones of the data entities according to the determined similarities while discounting for popularities of the data entities;
    presenting identifications of at least another one of the data entities having the highest rankings to the at least one of the data entities to a first user to recommend the at least another one of the data entities for use by the first user;
    determining that a user has deleted a data entity; and
    presenting, for display to the first user, an identification of a subset of the remaining ones of the data entities determined to be similar to the deleted data entity.

2. The method according to claim 1, wherein applying the collaborative filtering operation further comprises applying a weighted collaborative filtering operation on the data entities by using the collected data to determine values for a plurality of weights to be applied in the weighted collaborative filtering operation.

3. The method according to claim 1, wherein ranking the remaining ones of the data entities while discounting for popularities of the data entities comprises:
    determining first rankings of the remaining ones of the data entities based upon popularity;
    comparing the first rankings of the remaining ones of the data entities based upon popularity with the rankings of the remaining ones of the data entities according to the determined similarities; and
    ranking the remaining ones of the data entities based upon differences between the first rankings and the rankings according to the determined similarities.

4. The method according to claim 1, further comprising:
determining identifications of data entities currently stored on a user device of the first user; and
presenting an identification of a subset of the remaining ones of the data entities that have a highest ranked similarity to the identified data entities currently downloaded on the user device of the first user.

5. The method of claim 1, wherein the discounting for the popularities comprises reducing a rank of a given remaining data entity of the remaining ones of the data entities responsive to the given remaining data entity having a higher popularity.

6. The method according to claim 2, wherein applying the weighted collaborative filtering operation on the data entities further comprises calculating a similarity measure (S) among data entities (i, j) to determine similarity levels of the data entities (i) with respect to other data entities (j) using the following equation:

$$S(i, j) = \frac{\begin{array}{l}(w_1 * \# \text{ users who have data entities } i \text{ and } j + \\ w_2 * \# \text{ users who installed data entities } i \text{ and} \\ j \text{ in a short time window} + \\ w_3 * \# \text{ users who deleted data entity } i \text{ and} \\ \text{installed data entity } j \text{ in a short time window})\end{array}}{\sqrt{((w_1 + w_2 + w_3) * \# \text{users who have data entity } j)} * \sqrt{((w_1 + w_2) * \# \text{ users who have data entity } i + (w_3) * \# \text{ users who have removed data entity } i)}}$$

wherein $w_1$, $w_2$, $w_3$ comprise predetermined weights.

7. The method according to claim 2, further comprising:
determining an interest level of the users to the data entities based upon retention patterns of the data entities by the users; and
wherein applying the weighted collaborative filtering operation further comprises weighting the data entities having higher interest levels of the users higher than the data entities having lower interest levels.

8. The method according to claim 2, further comprising:
determining, for each of the users, a difference in time at which the respective users downloaded the data entities; and
wherein applying the weighted collaborative filtering operation further comprises weighting the data entities that were downloaded by the respective users within a predetermined length of time with respect to each other higher than the data entities that were downloaded outside of the predetermined length of time.

9. The method according to claim 2, further comprising:
determining, for each of the users, data entity pairs that correspond to a respective first data entity that has been downloaded within a predetermined length of time following deletion of a respective second data entity; and
wherein applying the weighted collaborative filtering operation further comprises weighting the determined data entity pairs higher than other data entity pairs.

10. The method according to claim 2, further comprising:
determining categories into which the data entities belong; and
wherein applying the weighted collaborative filtering operation further comprises weighting data entity pairs that belong to the same categories higher than data entity pairs that do not belong to the same categories.

11. The method according to claim 2, further comprising:
determining developers of the data entities; and
wherein applying the weighted collaborative filtering operation further comprises weighting data entity pairs that were developed by the same developers higher than data entity pairs that were developed by different developers.

12. The method according to claim 2, further comprising:
determining semantic information of the data entities; and
wherein applying the weighted collaborative filtering operation further comprises weighting data entity pairs having similar semantic information higher than data entity pairs that have dissimilar semantic information.

13. The method according to claim 2, wherein the data entities are available for downloading from a data entity store, said method further comprising:
causing a subset of the data entities to be displayed to the first user;
determining that the first user is interested in a first data entity; and
causing the highest ranked ones of the remaining ones of the data entities determined to be similar to the first data entity to be displayed to the first user.

14. An apparatus for managing a plurality of data entities, comprising:
a processor; and
a non-transitory storage medium storing instructions executable on the processor to:
collect data pertaining to transactions by users with respect to the data entities, wherein the data entities are available for use on user devices,
apply a weighted collaborative filtering operation on the data entities to determine similarity levels of the data entities with respect to other data entities by using the collected data to determine values for a plurality of weights to be applied in the weighted collaborative filtering operation, wherein the weighted collaborative filtering operation comprises calculating a similarity measure between a first data entity and a second data entity based on:
a number of users who have installed the first and second data entities within a specified time duration, and
a number of users who have deleted the first data entity and installed the second data entity within a specified time duration
for a given data entity of the plurality of data entities, rank remaining data entities of the plurality of data entities according to the determined similarity levels determined for the given data entity while discounting for popularities of the remaining data entities, and
present an identification of a first remaining data entity of the remaining data entities having a higher ranking than a second remaining data entity of the remaining data entities, the first remaining data entity presented to a user to recommend the first remaining data entity for use by the user.

15. The apparatus of claim 14, wherein the weighted collaborative filtering operation applied on the data entities to determine the similarity levels comprises indicating that a third data entity has a higher similarity to a fourth data entity responsive to determining that the third data entity was installed by a user within a predetermined time duration following deletion of the fourth data entity.

16. The apparatus of claim 14, wherein the discounting for the popularities of the remaining data items comprises reducing a rank of a given remaining data entity of the remaining data entities responsive to the given remaining data entity having a higher popularity.

17. The apparatus of claim 14, wherein the discounting for the popularities of the remaining data items comprises setting a rank of a given remaining data entity of the remaining data entities based on a difference between a first ranking assigned the given remaining data entity according to a popularity of the given remaining data entity and a second ranking assigned the given remaining data entity based on the ranking according to the determined similarity levels, and wherein the rank of the given remaining data entity is proportional to the difference between the first ranking and the second ranking.

18. A non-transitory computer readable storage medium storing program instructions that upon execution cause a computing device to:

collect data pertaining to transactions by users with respect to a plurality of data entities, wherein the data entities are available for use on user devices, and wherein the transactions comprise installations, deletions, and usage;

apply a weighted collaborative filtering operation on the data entities to determine similarity levels of the data entities with respect to each other by using the collected data to determine values for a plurality of weights to be applied in the weighted collaborative filtering operation, wherein the weighted collaborative filtering operation applied on the data entities to determine the similarity levels comprises indicating that a first data entity has a higher similarity to a second data entity responsive to determining that the first data entity was installed by a user within a predetermined time duration following deletion of the second data entity;

for a given data entity of the plurality of data entities, rank remaining data entities of the plurality of data entities according to the determined similarity levels while discounting for popularities of the remaining data entities, wherein the discounting for the popularities of the remaining data entities comprises reducing a rank of a given remaining data entity of the remaining data entities responsive to the given remaining data entity having a higher popularity; and present identifications of selected remaining data entities of the remaining data entities having the highest rankings to a user to recommend the selected remaining data entities for use by the user.

* * * * *